May 12, 1942.  W. H. KOPITKE  2,282,423
PROCESS AND APPARATUS FOR FORMING ARTICLES FROM ORGANIC PLASTIC MATERIAL
Filed Sept. 15, 1939  2 Sheets-Sheet 1
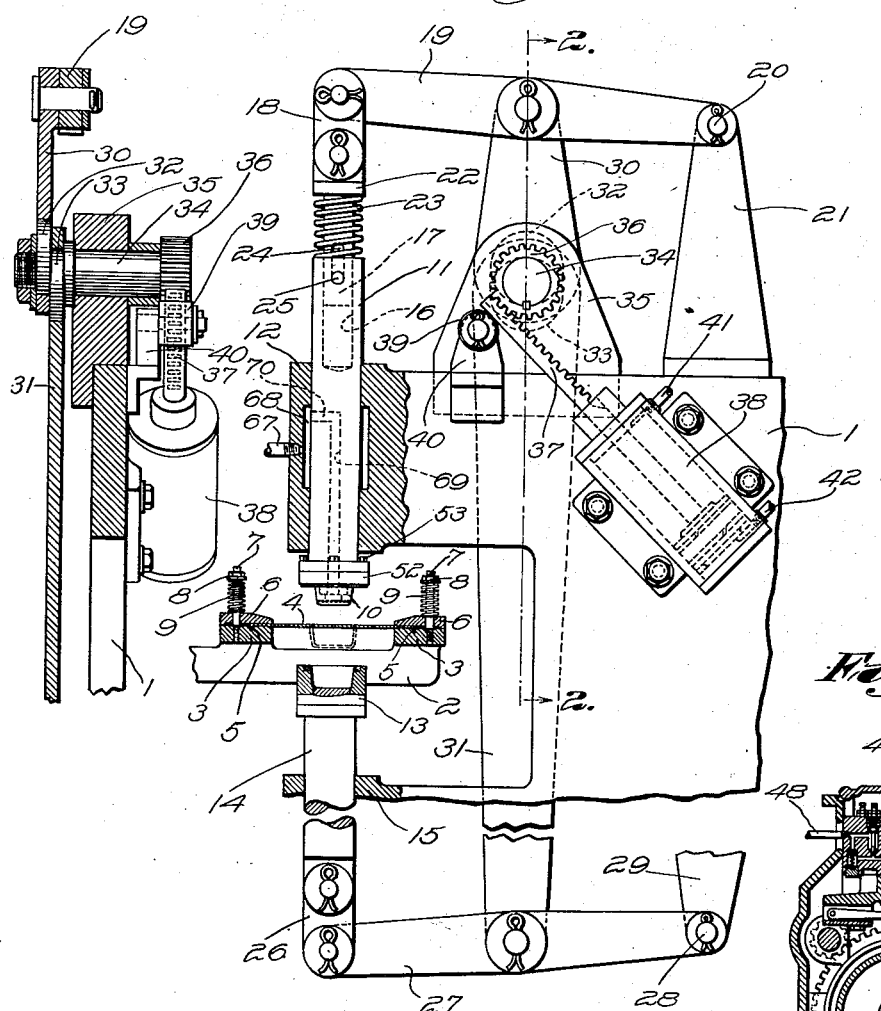
Inventor
William H. Kopitke
by Brown & Parham
Attorneys
Witness
W. B. Thayer

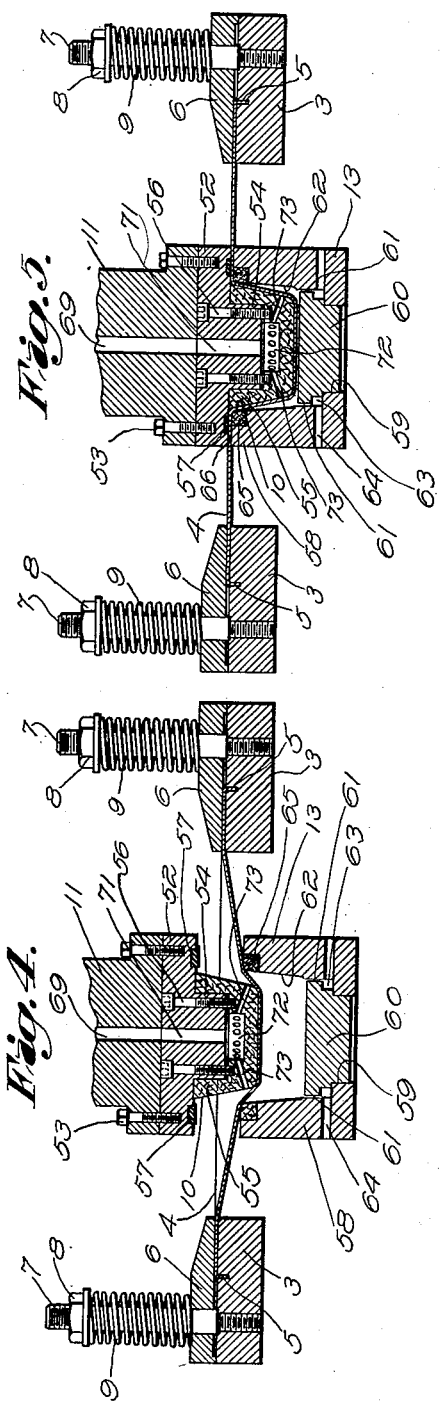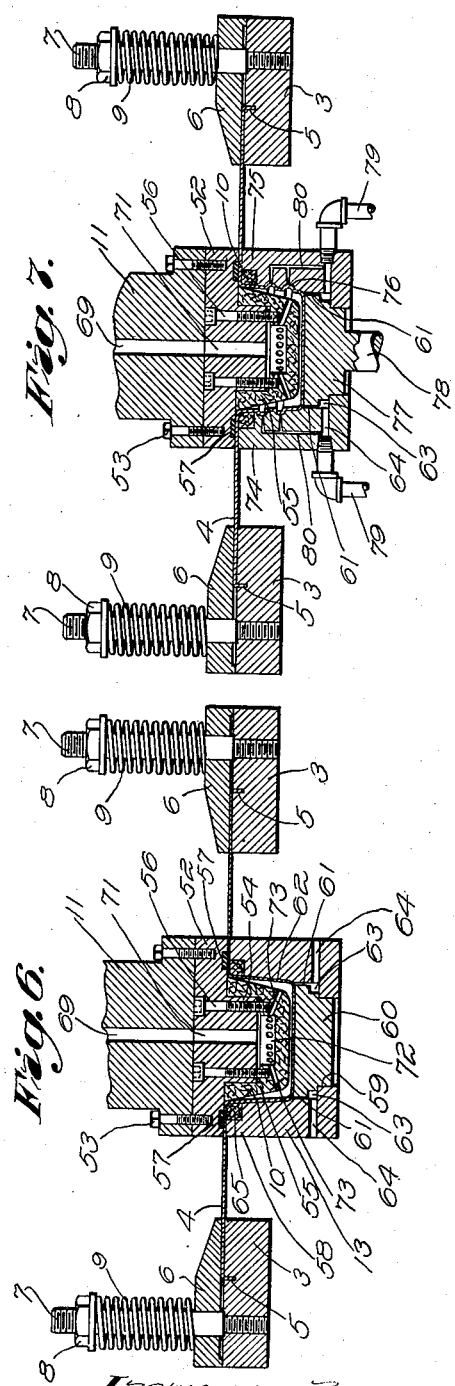

Patented May 12, 1942

2,282,423

UNITED STATES PATENT OFFICE 2,282,423

PROCESS AND APPARATUS FOR FORMING ARTICLES FROM ORGANIC PLASTIC MATERIAL

William H. Kopitke, West Hartford, Conn., assignor to Plax Corporation, Hartford, Conn., a corporation of Delaware Application September 15, 1939, Serial No. 295,009

11 Claims. (Cl. 18—19)

This invention relates to the forming of hollow articles from sheets or strips of organic plastic material and more particularly to the forming of such articles from material of this kind by the use of both mechanical and fluid pressure, the mechanical pressure being employed first in a preliminary forming of the sheet or strip and the fluid pressure being relied upon thereafter, or after the mechanical pressure forming operation has been partially completed, for completing the forming of the article.

Among the objects of the present invention are to provide a process and an apparatus by which hollow articles may be formed from sheet material which is of an organic plastic nature by first mechanically pressing or drawing a portion of the sheet, which has previously been rendered plastic and moldable by heat, to a preliminary shape which may thereafter be expanded by the use of differential fluid pressure to a final desired shape. This differential fluid pressure is applied to the opposite faces of the sheet while it is held, for example, between shaping dies of which the inner die or plunger is substantially smaller, at least at its extreme end, than the corresponding portion of the cavity of the outer die. Specifically it is an object of the invention to so supply fluid pressure, preferably through the inner die or plunger, that will exert a uniform expansive force upon the plastic material, while at the same time preventing the forming of marks thereon caused by the plastic material contacting the apertures through which the fluid pressure is supplied.

A further object of the invention is to provide a process and apparatus of the type hereinabove set forth, wherein the organic plastic material used in the forming of an article is prevented from coming into such close heat-transferring contact with the dies prior to the final shaping thereof by the dies as would interfere with the subsequent expansion of the plastic material to form the desired article without injury to the plastic material. Specifically, this object may be obtained by the use for portions of the dies which engage the sheet material during the press-forming thereof of material of such low heat conductivity that the plastic material will not be rigidified too soon in the process.

Other and more detailed objects of the present invention will become apparent from the following description and appended claims, taken in connection with the accompanying drawings in which:

Figure 1 is a fragmentary view, principally in elevation, but with parts broken away and shown in vertical section, illustrating a forming apparatus in accordance with the invention;

Fig. 2 is a fragmentary view substantially in transverse vertical section on the line 2—2 of Fig. 1;

Fig. 3 is a fragmentary view substantially in transverse vertical section of a timing device for fluid pressure which may be used in conjunction with the apparatus of Figs. 1 and 2;

Figs. 4, 5 and 6 are detailed views substantially in vertical section and transverse of the path of a ribbon or strip of plastic material being worked, illustrating various stages in the forming of an article in accordance with the process herein disclosed; and Fig. 7 is a view similar to Figs. 4, 5 and 6, but illustrating a modified form of the invention.

It has been suggested heretofore to form articles from individual sheets of plastic material which are held in parts at least of their perimetries, and are heated at their exposed central portions to render such portions plastic and moldable, and then to form these plastic and moldable portions to a desired shape by the use of cooler dies, wherein the portions thus shaped are cooled by heat extracted therefrom by the dies substantially concomitantly with the shaping thereof. It has also been proposed to perform similar operations in forming a plurality of articles from a strip or ribbon of organic plastic material, the lateral edge portions of this strip or ribbon being bent at angles to the main body portion thereof to form flanges which are arranged to slide through parallel grooves. In this way the central portion of the strip is prevented from deformation, which might otherwise occur, during the heating and shaping steps of the process by the relatively cool and rigid lateral edge portions sliding along the grooves as aforesaid.

The present invention is an improvement upon this process and upon the apparatus used therein, tending to overcome certain difficulties which may arise at times during the practice of the process above set forth. It has been found, for example, when using cooperating dies wherein the inner die or plunger conforms substantially to the interior of an article in contact with the cavity of the outer die, that the material upon cooling may tend to shrink, thus binding tightly upon the inner die or plunger and rendering it difficult to remove a completed article therefrom. Furthermore when using apparatus of the type previously proposed, as above set forth, and wherein the plunger is used to extract heat from material, the side portions of the articles were sometimes found to have rings thereon, rendering the articles unsightly and hence salable at a lower price if at all. This undesired result is believed to be due to the rate of cooling of the plastic material in contact with the inner die or plunger, which is higher than that desired.

The present invention overcomes these disadvantages of the prior art in that it provides not only for a preliminary shaping of an article in an intermediate form by a relatively small plunger or inner die cooperating with an outer die having a cavity of a shape to form the desired article, but also provides for a subsequent expansion, principally in lateral directions, of the material forming the article from about the plunger and into contact with the cavity of the outer die. The plunger is preferably of some material which is a relatively poor conductor of heat, so that when using thermoplastic material, for example, the plunger will not extract sufficient heat from the material during the mechanical pressing step of the process but that the material may later be expanded by differential fluid pressure applied to the opposite faces thereof to force it into contact with the outer die. The outer die is of material of such heat conductivity that it will then extract enough heat from the material forming the article so that the article will be rigidified when it has assumed the final desired form. At the same time, the present invention takes advantage of the fact that many thermoplastic materials tend to shrink somewhat upon cooling to rigidification, which was sometimes an objectionable feature in the prior art, but which, according to the present invention, tends to cause the article to shrink away from the cavity of the outer die and thus permits the easy removal thereof.

Another feature of the invention is the provision at the periphery of the opening into the cavity of the outer die of an insert of material of relatively low heat conductivity as compared with the material of which the remainder of the outer die is formed, so as to prevent the cooling of the side portions of the material going to form the side portions of the desired article during the pressing or drawing thereof.

Turning now to the accompanying drawings and particularly to Figs. 1 and 2 thereof, there is illustrated a portion of a device for forming hollow articles from a ribbon or strip of organic plastic material, it being understood that before the material passes to the portion of the machine shown in Figs. 1 and 2, the central portion thereof has been heated to an extent such that this portion is plastic and moldable. As shown, the device comprises a supporting member 1, which may be suitably mounted in any desired manner, not shown. Supported preferably from the member 1 is a support 2, the connection between these members also not being illustrated in the accompanying drawings. The support 2 has a pair of horizontal lower guide rails 3, which are shown in detail in Figs. 4 to 7. These guide rails extend parallel to the path of the ribbon or strip of organic plastic material, which is indicated at 4. The guide rails 3 are provided with suitable slots 5 formed in their upper surfaces parallel to the path of the ribbon or strip 4 and arranged to receive down-turned flanges formed upon the strip 4. Above the guide members 3 are a pair of spring-pressed upper guide members 6 bearing upon the lateral edge portions of the strip 4 and preventing the downwardly flanged portions thereof from coming out of the slots 5. In order to retain the guide member 6 in position, as shown in Figs. 4 to 7, the guide members 3 are provided with bolts 7 rigidly secured therein and extending loosely through apertures in the upper guide members 6. The upper ends of the bolts 7 are threaded to receive nuts 8, which confine the upper ends of compression springs 9 extending between the undersides of these nuts and the upper surfaces of the members 6.

The details of the structure thus far described are not a part of the present invention, as all that is required is that means be provided by which a sheet or strip of plastic material may be brought to the forming position after being heated to a plastic and moldable condition and distortion of the sheet or strip prevented during the heating, the movement to the forming position and the forming. The use of any means which will effect this result is within the purview of the present invention.

Arranged above the path of the strip 4 at the forming position is an inner die member or plunger, generally indicated at 10, this member being preferably interchangeably mounted upon the lower end of a vertical plunger shaft 11 which is mounted for vertical sliding movement toward and away from the path of the strip 4 in a suitable bearing portion 12 of the supporting means 1.

Arranged below the path of the ribbon or strip 4 is an outer die member or mold 13 which is preferably interchangeably mounted upon the upper end of a plunger shaft 14 mounted for vertical movement in axial alignment with the shaft 11 in a bearing portion 15 of the supporting means 1. While it is possible under certain circumstances to mount but one of the pressing or die members 10 and 13 for movement toward and away from the path of the strip 4, it is preferred to arrange them for simultaneous movement in axial alignment with one another toward and away from this path, so that upon the retractive movement of both members, the strip 4 is free to move along its horizontal path in alignment with the slots 5 in the guides 3, this latter movement being intermittent in character in the device herein disclosed and the forming operation in shaping an article as hereinafter set forth occurring during a dwell in the intermittent movement of the strip. Suitable means, not shown, may be provided for intermittently moving the strip 4 along its path in a desired manner.

Means are provided for moving the die members 10 and 13 toward and from the path of the strip 4 and for suitably cushioning the movement of the die 10. For this purpose the shaft 11 is provided with an axial bore 16 extending inwardly from its upper end and arranged slidingly to receive a shaft 17, which is connected by one or more links 18 with the outer end of a lever 19 pivoted at 20 to a bracket 21 carried by the supporting member 1. Extending between an upper flange 22 rigid with the shaft 17 and the upper end of the shaft 11 is a compression spring 23. The shaft 17 further has a laterally extending and vertically elongated slot 24 formed therein through which extends a pin 25 secured in the shaft 11. The construction is such that downward movement of the lever 19, counterclockwise about its pivot 20 as seen in Fig. 1, exerts a force through the links 18, the flange 22 and the compression spring 23 upon the upper end of the shaft 11. The force exerted downwardly upon the shaft 11 from the lever 19 is thus always resilient and is measured by the compression of the spring 23. Upward movement of the lever 19, clockwise about its pivot 20, results in a positive upward movement of the shaft 11 due to the engagement of the pin 25 with the lower end of the slot 24, the compression spring 23 being at this time fully extended.

The shaft 14 carrying the lower die 13 is connected by one or more links 26 with the outer end of a lever 27 pivoted at 28 to the lower end of a bracket 29 similar to the bracket 21 and likewise carried by the support 1. While there is no resilient means shown interposed in the connection between the lever 27 and the shaft 14, it is contemplated that a construction such as that including the spring 23 could be employed here, if desired.

For actuating the levers 19 and 27 so as in turn to move the dies respectively, the lever 19 has pivoted thereto at an intermediate point a link 30 and the lever 27 has pivoted thereto at an intermediate point a link 31. The links 30 and 31 are provided with circular apertures respectively embracing eccentric disks 32 and 33, both of which are rigidly mounted upon a shaft 34 journaled in a suitable bracket 35 carried by the supporting members 1, Fig. 2. At its opposite end the shaft 34 carries a pinion 36 rigidly secured thereto and adapted to be actuated by a rack 37 secured to the piston rod extending from a fluid pressure cylinder 38. A suitable roller 39 freely mounted on a stub shaft extending from a bracket 40 carried by the supporting means 1 engages the rear face of the rack 37 and retains it always in mesh with the pinion 36.

Fluid pressure may be conducted to the opposite ends of the cylinder 38 through pipes 41 and 42 from any suitable source under the control of any suitable controlling means. I have shown in Fig. 3, however, a timing means for controlling the application of fluid pressure which may be employed in controlling the application of fluid pressure to the machcine. It will be understood that this means may be located at any desired position preferably adjacent to the machine, the relative positions of the several elements not being material to the invention and not being illustrated in the accompanying drawings.

The device shown in Fig. 3 is a timer of a type which is now in common use in connection with glass bottle forming machinery and is shown and described in detail in Ingle Patents Nos. 1,843,159 and 1,843,160, both granted February 2, 1932, and No. 1,911,119, granted May 23, 1933. Briefly the device comprises a drum, generally indicated at 43, which may be suitably driven from any available source of power at a speed of one revolution for each mechanical cycle of the machine. Opposite the drum is a series of valves, one of which is indicated at 44, and which are located in a valve chest, generally indicated at 45. Fluid pressure from a suitable source is supplied to the interior of the valve chest 45 through a pipe 46 usually under the control of a master valve, generally indicated at 47. Leading from each of the valves respectively to an associated operating mechanism are pipes, one of which is indicated at 48. Opposite each valve is a valve actuating mechanism including a lever 49, which is also opposite one of a plurality of undercut grooves in the drum 43. In each of these grooves, one or more buttons, such as are shown at 50 and 51, are located, there being usually two buttons in each groove, including a long button and a short button. The operation of the device is such that when a short button in one of the grooves engages the lever 49 of the valve operating mechanism opposite that button, this lever will be moved to a position to be engaged by a latch to hold the associated valve in a position to permit the flow of fluid pressure from the main supply through the associated pipe 48 to the operating mechanism connected thereto. This pressure continues to flow (the latch holding the lever 49 to maintain the valve open) until a long button in the same groove engages the lever 49 and thereafter engages the lower end of the associated latch, causing a tripping of the latter and permitting the closing of the valve by a spring associated therewith as shown, so as to cut off further flow of pressure to the associated operating mechanism and to vent the line 48 from that mechanism through the valve to the atmosphere. It will be understood that a separate valve is associated with each of the operating mechanisms, for example, with each end of a fluid pressure cylinder such as 38. Thus in practice the pipe 41 of the cylinder 38 would be connected to one valve and the pipe 42 to another valve. Inasmuch as the buttons 50 and 51 are universally adjustable about their associated grooves in the drum 43, a universal adjustment of the timing of the operation of each of the operating mechanisms controlled by the timer will be obtained.

Turning now to Figs. 4, 5 and 6 and considering the construction of the inner die or plunger in detail, this plunger which has been generally indicated at 10, comprises a base member 52. This member is provided with a flange portion which may be removably attached to a corresponding flange portion at the lower end of the shaft 11 in any suitable manner as by bolts 53. It will be understood that any desired means may be employed for this purpose including that herein shown and described; or these parts may be formed integral, all within the purview of the present invention.

The base member 52 has a downwardly extending boss 54 which is adapted to center a member 55 forming the plunger or die proper. This member 55 is preferably of a relatively poor heat conducting material, as compared with metal, and in the present instance is formed of hard fiber. For securing the member 55 to the base member 52 there are provided a plurality of bolts 56 which pass loosely through suitable bores in the base member 52 and are threaded into the member 55 as shown.

Also located in the support 52 is an annular ring 57 formed preferably of rubber, or from some other suitable material which serves as a gasket to prevent flow of pressure to or from the space about the plunger at the stage of the operation shown in Fig. 6 and hereinafter described. It will be understood that while this ring or gasket 57 is shown associated with the flange of the plunger of die 10, it could be associated with the upper surface of the outer die or mold 13 if desired.

The outer die or mold 13 comprises an annular side member 58 having an aperture 59 formed centrally of the bottom thereof in which is located the stud portion of a bottom plate 60. This stud portion is driven into the aperture 59 with a drive fit, which in the usual case is air tight. The upper portion of the bottom plate 60 is of such size as to leave a very narrow slot 61 open between it and the adjacent part of the member 58 to provide a vent or exhaust passage from the mold cavity, which is generally indicated at 62. This slot communicates with an annular chamber 63 formed in part by an annular groove or rabbet in the bottom plate 60. The chamber 63 communicates in turn with the atmosphere through one or more passages 64.

At the entrance to the cavity 62 of the mold or outer die, the metal of the die is cut away to provide space for an annular insert member 65, which is of non-metallic material having a relatively low heat conductivity in respect to that of the material of the die; for example, hard fiber may be employed for this insert.

During the initial or pressing operation in the forming of an article shown in different stages in Figs. 4, 5 and 6, the heated and thus softened central portion of the strip 4 of organic plastic material is first engaged by the die member 55 and forced downwardly into the cavity 62 of the lower die. At this time, as seen in Figs. 4 and 5, the material contacts solely with the members 55 and 65, both of which are of relatively poor heat conducting material. Thus during this stage of the operation, but little heat is extracted from the plastic material by the dies, permitting the flow of the plastic material to bring it to the new form which is being imparted thereto. At about the termination of this operation, at the position of the parts shown in Fig. 5, the gasket 57 engages the plastic material, pressing it against the upper surface of the member 58 and thus bringing it for the first time into good heat conducting relationship with the metallic portion of the member 58, which is also of good heat conducting material. The organic plastic material, therefore, in the annular area indicated by the reference character 66 in Fig. 5 then loses sufficient heat so that this portion is rigidified. At the same time the gasket 57 serves to prevent the flow of pressure between the atmosphere and the space between the plastic material and the inner die member or plunger 55.

The next operation is the expansion of the plastic material within the mold cavity 62 into contact with the outer walls of this cavity, which is effected by the application of differential fluid pressure to the opposite sides of the body of plastic material. In Figs. 4, 5 and 6 this is effected by the application of positive or superatmospheric pressure to the inside of the partly formed article about the plunger. The application of this pressure may be controlled by the timer shown in Fig. 3 and it may be supplied therefrom through a pipe 67, Fig. 1, to an annular chamber 68 formed in the bearing portion 12 surrounding the shaft 11. The shaft 11 is provided with a central longitudinal bore 69 which communicates with a lateral bore 70 leading to one side of the shaft 11 and so arranged that it is at all times open to the interior of the chamber 68, irrespective of the position or movement of the shaft 11 in its bearing. The bore 69 communicates at its lower end with an aligned bore 71 in the base member 52 of the upper die 10, which in turn communicates with a cylindrical chamber 72 formed in the die member proper 55. The chamber 72 communicates through a plurality of inclined bores with the outside of the member 55, preferably above the shoulder portion thereof a sufficient distance so that during the pressing operation the apertures into the plunger member 55 will not be in a surface having a sufficient pressure upon the plastic material to mark that surface. The number of the bores 73 is preferably such that the fluid pressure will be substantially uniformly supplied to the interior of an article being expanded from about the plunger. In practice it is preferred that the distance between these bores on the outside of the plunger be not greater than ½ inch from center to center. One or more suitable slots uniformly disposed about the plunger may if desired be employed in place of the bores 73 for the same purpose.

While it is shown in Figs. 5 and 6 that the plunger reaches its final position prior to the supplying of fluid pressure to expand an article to conform to the cavity of the outer die or mold 13, it is contemplated that the timing of the application of the fluid pressure may be adjustably varied as may be desired or found necessary in respect to the timing of the plunger movement so, for example, to supply fluid pressure to keep plastic material from coming into too close contact with the plunger even prior to the completion of the plunger stroke, thus also assisting in preventing the rigidification of the lateral wall portions of the article during the final stages of the pressing operation.

The relative dimensions of the inner die or plunger 10 and the mold cavity 62 are of importance in the present invention. As shown in Fig. 5, the plunger does not conform to the inside of an article when the die members are at the ends of their operative strokes. The forward or leading end of the plunger is substantially smaller in lateral dimensions than is the cavity 62 of the die 13. At the same time, the lower end of the plunger reaches almost to the inside of an article after it has been expanded by fluid pressure as aforesaid into conformity with the mold cavity 62, Fig. 6. As a result the fluid pressure expansion is largely in lateral directions. In the present instance, the mold cavity 62 is slightly tapered from top to bottom. The plunger, however, is tapered to an even greater extent, so as to illustrate an important feature of the invention, namely, that the plunger be of such form as to taper in respect to the conformation of the mold cavity. In this way, it is possible to use a plunger with its rapid and certain operation in making a preliminary form from the plastic sheet material as shown by a comparison of Figs. 4 and 5, while utilizing fluid pressure to effect a final forming of the article, as shown by a comparison of Figs. 5 and 6. The lateral expanding operation serves to cause the plastic material to conform to the cavity of the outer die and thus to permit the rapid withdrawal of the plunger after the completion of an article, preventing the material from shrinking around the plunger during the cooling thereof, so as to make for the rapid production of articles.

As set forth above, care has been taken to prevent the rigidification of the portion of the plastic material being formed during the pressing operation. However, after the plastic material has been expanded by fluid pressure into conformity with the cavity 62 of the outer die 13, it is then and for the first time brought into good heat transferring relationship with the outer die, which is preferably of material having good heat conduction and capacity. At this time, therefore, the plastic material is rigidified by heat transferred between it and the plastic material 4 forming the article.

While the present invention is particularly adaptable to the forming of articles from thermoplastic organic material, such for example as cellulose acetate compounds, it is contemplated that any material of an organic plastic nature, which may be rendered plastic and moldable by the application of heat and which may thereafter be rigidified by a control of the temperature thereof, is to be considered within the purview of this invention. For example, it is contemplated that some of the so-called thermosetting materials may well be rendered sufficiently plastic and moldable for the applicant's purpose by the application of a relatively small amount of heat and may thereafter be converted to a relatively hard and rigid condition by the application of still more heat subsequent to the formation thereof.

Furthermore, while no means is particularly illustrated in the present drawings, or herein described by which either of the dies may be positively cooled or their temperature otherwise controlled for the purpose of controlling the rigidification of the plastic material subsequent to the formation thereof, it is contemplated that any suitable means including those which are now well known in the art may be employed for controlling the temperature of either or both the die members. The purpose in any case is that the plastic material be first press-formed while temperature changes are inhibited to a large extent during the pressing operation; then after the flowing or fluid pressure expansion has been completed, the plastic material is suitably rigidified in the shape thus imparted thereto by the conformation of the cavity 62 of the outer die.

In Fig. 7 there is illustrated a modified form of the invention wherein the support for the strip 4 of plastic material is the same as that previously described as is also the inner die or plunger 10. The outer die is, however, of a different type necessitated by a different conformation of the cavity thereof. As shown, the outer die is formed in two parts 74 and 75 jointly replacing the single part 58 of Figs. 4 to 6. These two parts are arranged for an opening and closing movement in a suitable manner, not shown. The cavity of the die so formed is shown as having a re-entrant portion here indicated as a screw thread 76, thus requiring the opening of the die members 74 and 75 to permit the removal of an article formed therein. A bottom plate 77 is provided, which in this instance cannot be carried by the outer die member as was the bottom plate 60, but is provided with a separate support, not shown, associated with a stem 78 of the bottom plate. It is possible, of course, that the bottom plate could be secured to one of the parts 74 or 75, as long as it is movable in respect to the other. An individual support is, however, a usual provision and is ordinarily preferable.

The arrangement for venting the mold cavity in this instance may be the same as that shown in Figs. 4 to 6; and to the extent the parts are similar, they are given the same reference numbers. It is contemplated, however, that instead of or in addition to merely using pressure applied through the passage 69 and the bores 73 as previously described, it may be desired to use vacuum applied to the interior of the mold cavity. The purpose from a general point of view is to establish a differential pressure on the opposite sides of the article being formed so as to cause it to expand to conformity with the mold cavity.

In order to apply vacuum the passages 64 are connected through pipes 79 with a suitable source of vacuum, not shown, preferably under control of a timing means, such as that shown in Fig. 3. If this timer is to be used for vacuum as well as for pressure, or if two or more different pressures are being used, some sections of the valve chamber 45 will be segregated from the remainder in the manner shown for example by certain of the Ingle patents above referred to, so that certain valves control certain pressures, while other valves control other pressures. The construction of the valve mechanisms may be otherwise the same. The application of vacuum through the pipes 79 is particularly useful in forming articles having re-entrant portions at their interior extending laterally into the side walls of the mold cavity, as shown by the screw thread 76, in that it is possible to provide in the walls of the members 74 and 75 branch passages as indicated at 80 communicating through small apertures or ports with the inside of the undercut portions of the walls of the mold cavity as shown, thus assisting in the forming of the plastic material into these portions.

It will be understood that after the forming of an article is completed, whether in the form of Figs. 4 to 6 or that of Fig. 7, the mold and plunger are moved away from the formed article as by the mechanism of Fig. 1 for the form of Figs. 4 to 6 and by a combined opening movement of the mold members 74 and 75 possibly about a vertical axis, coupled with a subsequent bodily movement of the parts away from the sheet in the form of Fig. 7. The formed article, which is still integral with the sheet, is then moved to another position along the path of the strip 4 and in the usual case is cut out from the remainder of the sheet by suitable means, not shown. Inasmuch as these means form no part of the invention, they have not been illustrated herein.

While there is illustrated and described herein but one principal form of the present invention and certain modifications of parts thereof, it will be understood that many changes may be made in the device particularly shown and described in addition to those specifically illustrated. I do not wish to be limited, therefore, except by the scope of the appended claims, which are to be construed as broadly as the state of the prior art permits.

I claim:

1. The process of forming hollow articles from organic plastic sheet material which may be rendered plastic and moldable by heat, which comprises drawing a portion of a heated and plastic sheet of such material between inner and outer dies having flange means associated therewith for limiting their movement toward one another and of which the inner die does not completely fill the cavity of the outer die, and after said dies have been moved together to a point such that the flange means associated therewith engage the sheet therebetween, supplying fluid pressure through said inner die to expand the plastic material between it and the outer die into conformity with the cavity of the latter.

2. The process according to claim 1, wherein said inner die extends almost to the bottom of the cavity of said outer die when the dies are in their cooperative position in which the associated flanges engage the opposite faces of a sheet of plastic material therebetween, and wherein the fluid pressure is supplied laterally and substantially uniformly through the lateral side walls of the inner die adjacent to the outer extremity thereof to expand the plastic material laterally to conform to the cavity of said outer die, the fluid pressure expansion in depth of the plastic material being minimized by the relative dimensions of said dies, the material being brought almost to the bottom of the cavity by the pressing operation.

3. The process of forming hollow articles from organic plastic sheet material which may be rendered plastic and moldable by heat, which comprises drawing a portion of a heated and plastic sheet of such material between inner and outer dies of which the inner die does not fill the cavity of the outer die by a substantial amount in addition to the space occupied by the material being molded, and supplying pneumatic pressure through the lateral sides of said inner die adjacent to the end thereof during the time said dies are moving toward one another and as they are approaching their final position in drawing the plastic material to provide a gaseous cushion preventing the undue extraction of heat from the plastic material by the side portion of said inner die during the drawing of the plastic material.

4. Apparatus for forming hollow articles from organic plastic sheet material which may be rendered soft and moldable by heat comprising a metallic outer die having a cavity therein shaped to form a desired article, a non-metallic plunger cooperating therewith and substantially smaller at least adjacent to its forward end than the cavity of said die, the difference between the sizes of the die cavity and the plunger being substantially greater than that required to accommodate the material being molded, means for relatively moving said die and said plunger to cause them to approach one another to engage therebetween and to shape a sheet of heated and moldable plastic material by drawing it, and a non-metallic insert located at the perimeter of the cavity of said outer die and adapted to be engaged by the sheet of material being drawn between said die and said plunger upon their movement together to prevent too rapid loss of heat from the plastic material to the material of the outer die by conduction through the perimetral portion of the outer die in contact with the sheet of plastic material being drawn.

5. Apparatus for forming hollow articles from organic plastic sheet material which may be rendered soft and moldable by heat, comprising an outer die of material of relatively high heat conductivity and having a cavity therein shaped to form the desired article, a plunger cooperating with said die and substantially smaller adjacent to its forward end than the cavity of said die, the difference between the sizes of the die cavity and the plunger being substantially greater than that required to accommodate the material being molded, means for relatively moving said die and said plunger to cause them to approach one another to engage therebetween a sheet of heated and moldable plastic material, and a non-metallic insert located at the perimeter of the cavity of said outer die and adapted to be engaged by the sheet of material being drawn between said die and said plunger upon their movement together to prevent too rapid loss of heat from the plastic material to the material of the outer die by conduction through the perimetral portion of the outer die in contact with the sheet of plastic material being drawn prior to the completion of the drawing operation.

6. Apparatus for forming hollow articles from organic plastic sheet material which may be rendered soft and moldable by heat, comprising a metallic outer die having a cavity therein shaped to form a desired article, a plunger of hard fibre cooperating therewith and being tapered toward its forward end in respect to the conformation of the cavity of said die, the difference between the sizes of the die cavity and the plunger being substantially greater than that required to accommodate the material being molded, means for relatively moving said die and said plunger to cause them to approach one another to engage therebetween and to draw the sheet of moldable and plastic material, and an insert of hard fibre located at the perimeter of the cavity of said outer die and adapted to be engaged by the sheet of material being drawn between said die and said plunger upon their movement together to prevent too rapid loss of heat from the plastic material to the material of the outer die by conduction through the perimetral portion of the outer die in contact with the sheet of plastic material being drawn during the drawing thereof.

7. Apparatus for forming hollow articles from organic plastic sheet material which may be rendered plastic and moldable by heat, comprising a die having a cavity shaped to form the desired article, a plunger cooperating therewith having its forward end at least substantially smaller than said cavity, the difference between the sizes of the die cavity and the plunger being substantially greater than that required to accommodate the material being molded, means for relatively moving said die and said plunger to bring them toward and away from each other so that upon their movement together, they may shape a sheet of organic plastic material by drawing it therebetween, and means for supplying fluid pressure through said plunger to expand a drawn sheet of plastic material into conformity with the cavity of said die.

8. Apparatus in accordance with claim 7, wherein said means for supplying fluid pressure comprises a plurality of passages through the side walls of said plunger adjacent to the forward end thereof constructed and arranged to supply the fluid pressure substantially uniformly around the plunger to expand the plastic material.

9. Apparatus in accordance with claim 7, comprising in addition means for adjustably timing the application of the differential fluid pressure used to expand the material in respect to the time of movement of the plunger in drawing the sheet material in the die.

10. Apparatus in accordance with claim 7, wherein said means for supplying fluid pressure comprises an annular series of holes opening through the side of the plunger above and adjacent to the end thereof and spaced substantially equi-distantly apart around the periphery of the plunger at distances not more than one-half inch from center to center between said holes.

11. Apparatus in accordance with claim 7, wherein the diameter of the portion of said plunger opposite the entrance end portion of the cavity of said die at the termination of the movement of these parts toward one another is substantially as large as the interior of this portion of an article formed within said die, said plunger tapering to substantially smaller dimensions in respect to the dimensions of the corresponding part of the cavity of said die toward the outer end of the plunger.

WILLIAM H. KOPITKE.